(12) United States Patent
Gummel et al.

(10) Patent No.: US 9,193,101 B2
(45) Date of Patent: Nov. 24, 2015

(54) METHOD FOR MANUFACTURING AN ARTICLE MADE OF COMPOSITE MATERIAL

(75) Inventors: Micah Gummel, East Kingston, NH (US); Yann Marchal, Portsmouth, NH (US); Antoine Phelippeau, Portsmouth, NH (US)

(73) Assignee: SNECMA, Paris (FR)

( * ) Notice: Subject to any disclaimer, the term of this patent is extended or adjusted under 35 U.S.C. 154(b) by 381 days.

(21) Appl. No.: 13/703,487

(22) PCT Filed: Jun. 22, 2011

(86) PCT No.: PCT/FR2011/051439
§ 371 (c)(1),
(2), (4) Date: Dec. 11, 2012

(87) PCT Pub. No.: WO2011/161380
PCT Pub. Date: Dec. 29, 2011

(65) Prior Publication Data
US 2013/0082417 A1    Apr. 4, 2013

(30) Foreign Application Priority Data

Jun. 25, 2010   (FR) ...................................... 10 55128

(51) Int. Cl.
*B29C 45/00*    (2006.01)
*B29C 33/22*    (2006.01)
(Continued)

(52) U.S. Cl.
CPC ............. *B29C 45/0005* (2013.01); *B29C 33/22* (2013.01); *B29C 33/306* (2013.01);
(Continued)

(58) Field of Classification Search
CPC .. B29C 45/0005; B29C 33/22; B29C 33/306; B29C 33/3892; B29C 70/543; B29C 70/42; B29C 70/46; B29L 2031/08; B29L 2031/7504; F04D 29/542; F04D 29/023; F04D 29/526; F04D 29/545
USPC .......................................................... 264/266
See application file for complete search history.

(56) References Cited

U.S. PATENT DOCUMENTS 4,248,649 A * 2/1981 Harrison et al. .............. 156/174
(Continued)

FOREIGN PATENT DOCUMENTS

| EP | 1 674 244 | 6/2006 |
| EP | 2 077 183 | 7/2009 |
| GB | 2 243 104 | 10/1991 |

OTHER PUBLICATIONS

Bayer, RIM Part and Mold Design Guide (2008), Edition Nov. 2008, p. 32.*

*Primary Examiner* — Alison Hindenlang
*Assistant Examiner* — Jerzi H Moreno Hernandez
(74) *Attorney, Agent, or Firm* — Oblon, McClelland, Maier & Neustadt, L.L.P.

(57) ABSTRACT

A method for manufacturing an article made of a composite material including a polymer matrix reinforced by a fibrous structure, the method including: placing the fibrous structure on a substrate; forming a molding surface, covering the structure with a mating mold; and compacting the structure by moving the surface of the mating mold toward the surface of the substrate. The substrate includes a cylindrical portion and a wall positioned radially relative to the cylindrical portion, and the mating mold includes two portions that are mobile relative to one another and that are moved toward the axis of the cylindrical portion and towards the radial wall of the substrate, respectively. The method can be used for example for manufacturing a fan casing of a turbojet engine.

5 Claims, 3 Drawing Sheets

Figure 1:
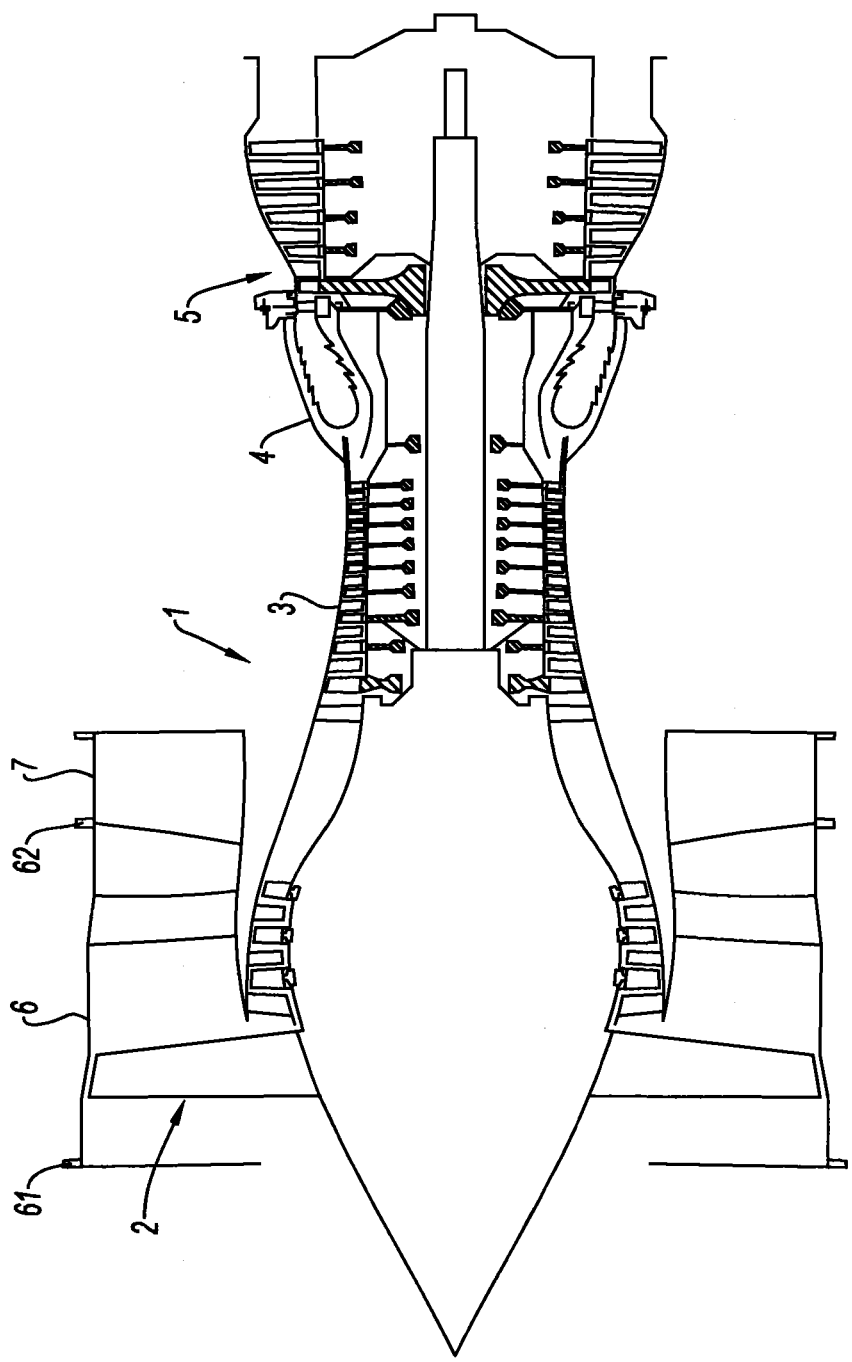

(51) Int. Cl.

| | | |
|---|---|---|
| *B29C 33/30* | (2006.01) | |
| *B29C 70/46* | (2006.01) | |
| *B29C 70/54* | (2006.01) | |
| *F04D 29/02* | (2006.01) | |
| *F04D 29/52* | (2006.01) | |
| *F04D 29/54* | (2006.01) | |
| *B29L 31/00* | (2006.01) | |

(52) U.S. Cl.
CPC .............. *B29C 70/46* (2013.01); *B29C 70/543* (2013.01); *F04D 29/023* (2013.01); *F04D 29/526* (2013.01); *F04D 29/542* (2013.01); *B29L 2031/7504* (2013.01)

(56) References Cited

U.S. PATENT DOCUMENTS

| | | | |
|---|---|---|---|
| 5,009,687 A | 4/1991 | Kromrey | |
| 5,145,621 A | 9/1992 | Pratt | |
| 7,905,972 B2 * | 3/2011 | Xie et al. | 156/189 |
| 2004/0113315 A1 * | 6/2004 | Graham | 264/266 |
| 2006/0134396 A1 | 6/2006 | Blanton et al. | |
| 2007/0182071 A1 * | 8/2007 | Sekido et al. | 264/511 |
| 2008/0206048 A1 * | 8/2008 | Coupe et al. | 415/200 |
| 2009/0200700 A1 | 8/2009 | Marlin et al. | |
| 2010/0288429 A1 * | 11/2010 | Mathon et al. | 156/243 |
| 2012/0099981 A1 * | 4/2012 | Verseux et al. | 415/200 |
| 2012/0178327 A1 * | 7/2012 | Ogoe et al. | 442/172 |
| 2013/0136582 A1 * | 5/2013 | Mizokami et al. | 415/173.1 |

OTHER PUBLICATIONS

International Search Report Issued Nov. 3, 2011 in PCT/FR11/51439 Filed Jun. 22, 2011.

* cited by examiner

METHOD FOR MANUFACTURING AN ARTICLE MADE OF COMPOSITE MATERIAL

The present invention relates to the field of composite materials comprising a polymeric matrix reinforced by a fibrous structure, and more particularly, the use of such materials in manufacturing aeronautical or turbo-machine parts.

In the aeronautical field, there is a need to reduce the mass of components of engines while maintaining at a high level the mechanical properties thereof. In a multiflux turbo-engine, the blower casing defining the contour of the air vein entering the engine and inside which the rotor of the blower is located is now made of a composite material. It comprises a ferrule provided upstream and downstream with, both radial and transversal, external flanges, for linking and mounting to other components of the engine, including the air inlet profile upstream and the intermediary casing downstream. The casing supports various elements and should be able to retain objects resulting from a blower blade breaking.

A method for manufacturing a part such as a blower casing made of a composite material comprises arranging a fibrous structure on a mandrel, the profile of which corresponds to that of the part to be achieved. The fibrous reinforcement could be manufactured, for instance, through three dimension weaving with a progressive thickness as described in patent EP 1 961 923 in the name of the assignee. The fibrous reinforcement is made with a tubular fibrous preform forming a single part with reinforcing parts corresponding to the flanges of the casing. Manufacturing is done with the structure being compacted and impregnated by a resin and the latter being polymerized in order to achieve the part.

This invention relates to a manufacturing method wherein impregnating the fibrous reinforcing part is achieved by the RTM injecting method, being the acronym for Resin Transfer Moulding. According to this method, the fibrous structure is enclosed while being compacted in a rigid mould with a stiffened geometry, having its shape corresponding to the part that is to be obtained, and the resin is injected inside the mould after vacuuming the case being. The mould comprises a first part forming a support for the fibrous structure and a counter mould being put on top of the fibrous structure. The structure is compacted by bringing closer the walls of both parts of the mould.

The content of fibres is an important parameter for designing a part of such a type. More particularly, for a part such as a casing with a conical vein and integrated flanges, it is important that the content of fibres be high, both in the vein area as in the flanges. Thus, it is required to apply compaction stresses with different orientations depending on the areas of the part without hindering the closure of the mould and damage the integrity of the fibrous reinforcement.

The designs of the prior art injection moulds, for such a type of part, do not allow to apply satisfactory compaction stresses in the areas of the flanges. Indeed, a counter mould made in a single piece is moved following a direction perpendicular to the main surface of the support and all the parts of the support are therefore not oriented favourably with respect to the shift direction. This results in a final layout of the fibres in such areas not being optimum from the mechanical strength point of view.

DESCRIPTION OF THE INVENTION

This invention aims at providing a method for manufacturing a cylindrical part, having radially oriented flanges, allowing for both the requirement of the highest possible content of fibres resulting from the fibrous structure being compacted and the optimum orientation of the fibres to be combined.

Such an objective is achieved with a method for manufacturing an item made of a composite material formed with a polymeric matrix reinforced with a fibrous structure, comprising the steps of positioning the fibrous structure on a support forming a moulding surface, covering with a counter mould and compacting said structure through the surface of the counter mould being brought closer to that of the support, then of injecting of the polymer matrix in said fibrous structure, characterized in that, the support comprising a cylindrical part and a wall radially oriented with respect to the cylindrical part, the counter mould comprises two parts able to move one relative to the other being moved in a direction respectively one towards the axis of the cylindrical part and the other towards said radial wall.

The method of this invention has the advantage of being able to position and compact fibres, according to the required final product.

In so far as the orientation of the fibres is optimum within the enclosure of the mould, the method further offers the advantage of achieving the impregnation of resin in such a stiffened configuration.

An additional advantage lies in having the possibility to dry to the final shape, should the fibrous reinforcement require this.

Finally, the geometry of the connecting radii between the vein and the flanges is also ensured by means of such a method.

According to an embodiment, the counter mould comprises a main part having a shape complementary to that of the cylindrical part of the support and a corner with a first wall, having a shape complementary to that of said radial wall, being interposed between said main part of the counter mould and said radial wall of the support, the counter mould and the corner being arranged so that the corner moves perpendicularly in the direction towards said radial wall of the support when the counter mould is moved in the direction towards the cylindrical part.

More specifically, the corner has a second wall having a shape complementary to the wall portion of the cylindrical part being adjacent to that of said radial wall, and, advantageously, the corner has a wall portion with a rounded section between said first and second walls.

In order to more easily implement the method, a metal sheet is arranged under said second wall of the corner so as to improve gliding of the corner on the fibrous structure.

According to a feature, the central part of the counter mould comprising a wall portion slanted with respect to said axis, the corner comprising a third wall slanted with respect to said axis, said wall portions coming in contact one with the other in order to achieve gliding of the corner in the direction towards said radial wall when the counter mould is moved in the direction towards the cylindrical part.

More particularly, the counter mould is made of at least two cylinder sectors. According to the preferred embodiment, the support comprises a cylindrical part and two walls radially oriented on both sides of the cylindrical part. These two latter walls make up the flanges of the casing.

The counter mould is brought closer to the surface of the mould so as to compact the fibrous structure and reduce the thickness thereof both in the radial direction with respect to the axis of the cylindrical part as well as perpendicularly to the surface of the support after the counter mould has been positioned.

The method is applicable, more specifically, to manufacturing a casing for a turbo-machine.

SHORT DESCRIPTION OF THE FIGURES

Figure 2:
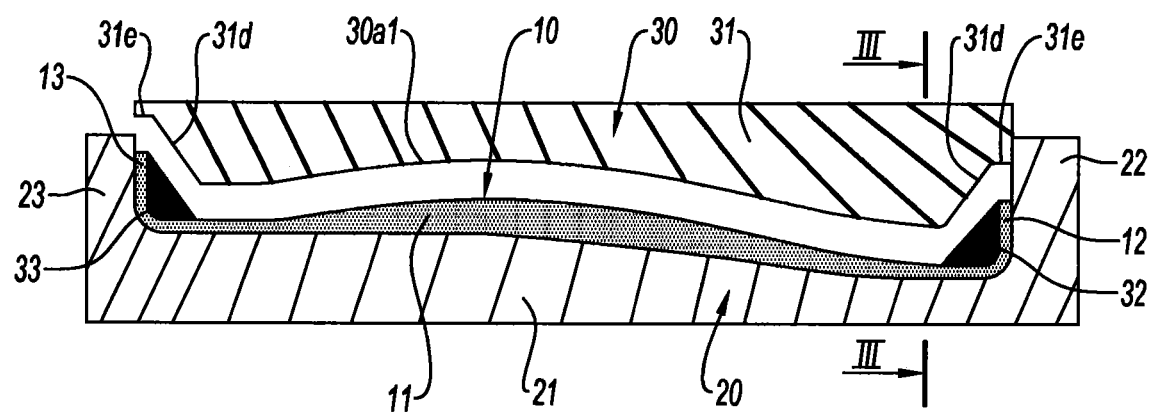
Figure 3:
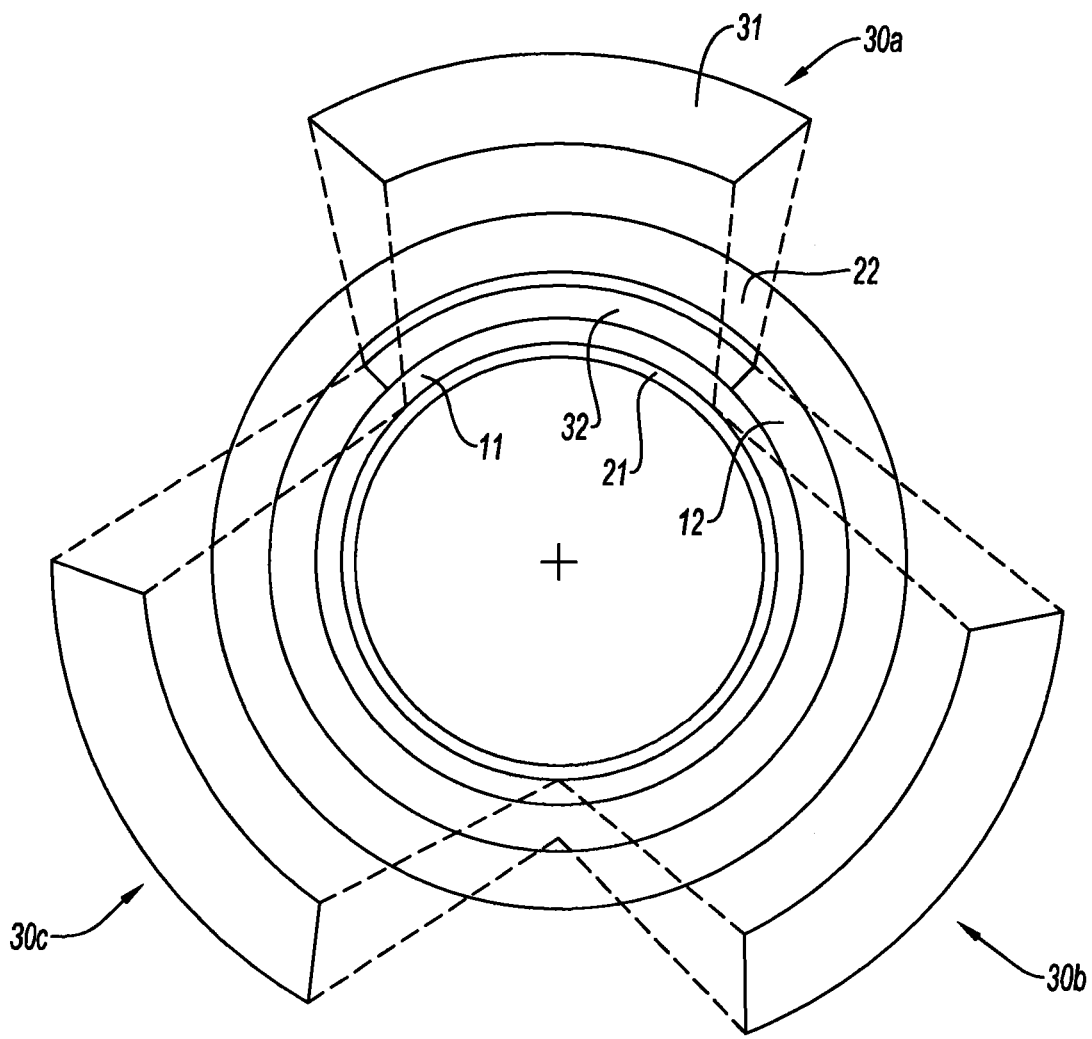
Figure 4:
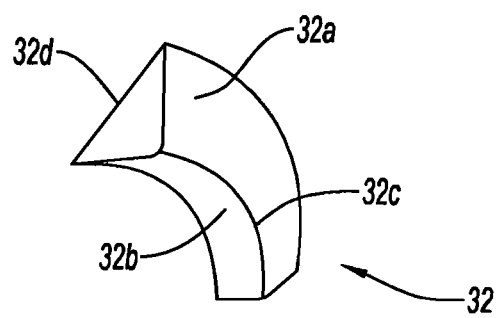

Other characteristics and advantages of this invention will become evident from the following description, referring to the appended figures respectively showing:

FIG. 1, an axial sectional schematic view of a front blower gas turbo-engine;

FIG. 2, an axial half sectional view of a mould for manufacturing a blower casing;

FIG. 3, a front sectional view of the mould along the direction III-III of FIG. 2; and FIG. 4, a perspective view of a corner element of the counter mould.

DETAILED DESCRIPTION OF AN EMBODIMENT

This invention is applied to the manufacture of a bypass turbojet blower casing, with an example thereof being schematically illustrated on FIG. 1. The engine comprises from upstream to downstream, the flow direction of gases, a front blower 2 at the engine inlet, a feeding compressor, a HP compressor 3, a combustion chamber 4, and high and low pressure turbines 5. The blower 2 is rotated by the turbine BP inside a blower casing 6. The blower casing defines the air volume entering inside the engine. A part of such air, constituting the primary flux, is guided inside the engine where it is successively pressed by the feeding compressor and the HP compressor. It feeds the combustion chamber 4 where its energy is increased by the combustion of the fuel. The gases being produced are expanded in the successive turbine stages and then ejected. The other part of the air constitutes the secondary flux, which is ejected in the atmosphere directly or after blending with the primary flux depending on the application of the engine. The engine is represented without the shell enclosing it. The blower casing 6 has a substantially frustoconical cylindrical shape with two flanges, one upstream 61 and the other downstream 62. The upstream flange 61 comprises means for fastening the air inlet fairing (not shown). The downstream flange connects the casing to the structural casing 7 also referred to as the intermediary casing.

Such a casing is advantageously made in a composite material with a fibrous reinforcement being densified by a matrix. The fibrous material is, for instance, made of carbon, an aramid glass or other and the matrix is made of a polymer such as an epoxide, a bismaleimide, or a polyimide.

The fibrous reinforcement is formed through winding on a mandrel with a fibrous texture.

FIG. 2 illustrates an example of a device for moulding the casing. A support 20 has an external annular surface with the same profile as the part to be achieved, i.e. in the present case, the internal surface of the blower casing. Such a support comprises a cylindrical part 21 with the shape of a mandrel and is provided with two transversal flanges 22 and 23 shaped so as to allow for the flanges of the casing to be manufactured. According to the method, the fibrous reinforcement is positioned around the mandrel so as to achieve a preform 10. The embodiment of the preform is not limitative. It could be made through winding distinct webs superimposed until the desired thickness is obtained, or through winding a web in several turns. The webs may have been plaited or even woven: the preform may also been achieved through threading a sleeve, either plaited or woven, around a mandrel or even through winding filaments around the mandrel.

The preform 10 comprises a central part 11, the thickness thereof is not required to be constant along its whole length, more specifically over-thicknesses are provided on the part along the axis being perpendicular to the surface scanned by the blower blades. Those over-thicknesses enable to build a reinforcement able to absorb shocks from debris or other objects as a result of the blades breaking. The preform also extends along two end supporting parts in two radial portions 12 and 13 in order to achieve flanges.

The manufacture of the part proceeds through positioning a counter mould 30 on the preform so as to build a volume wherein the polymer of the matrix is injected with the help, if required, of a vacuum source. In the example, this counter mould comprises three parts 30a, 30b and 30c, as illustrated on FIG. 3; the internal side of the counter mould 30a1, 30b1 and 30c1 respectively is shaped depending on the form to be imparted to the external surface of the part. Each one of the parts gets stuck between both end supporting parts 22 and 23. When all three parts are positioned, they provided for a closed volume with the mandrel 21 and the two supporting parts 22 and 23.

As can be seen on FIG. 2, the internal axial profile of each counter mould element comprises a central part 31 corresponding to the central part 11 of the preform and two end parts coming in abutment against the end radial part of the preform.

As a result of the large number of fibres, there is an interstitial vacuum being filled by the matrix upon the injection of the polymer. However, the content of fibres in the finished part is a first order parameter for the mechanical strength thereof. The porosity of the preform should thus be kept under control and be maintained within some limits.

This is why it is required to compact the fibrous structure constituted by the preform. Simply radially bringing the elements of the counter mould closer in the direction towards the preform would result in the thickness of the central part being reduced, but the end portions 12 and 13 would not be properly compressed. Surfaces sliding therebetween would result in beads or folds being formed. In order to overcome such a problem, two corner shaped counter mould elements 32 and 33 are provided in the area of the preform located in the vicinity of the radial portions 12 and 13.

Each counter mould element with a corner shaped section extends following a circle arc with the counter mould element to which it is adjacent. There are illustrated in FIG. 3, three corner shaped counter mould elements respectively associated with the counter mould elements 30a, 30b 30c. Each corner shaped counter mould element 32 or 33 comprises a first wall 32a, 33a respectively opposite the radial portion 12, 13 of the preform. It also comprises a second cylindrical wall portion 32b, 33b, perpendicular to the first wall 32a, 33a and opposite the central part 11 of the preform 10, adjacent to the radial portion 12, 13. The two walls 32a and 32b, 33a and 33b are connected via a rounded section, preferably circle arc shaped, rounded section, 32c, 33c respectively. The two, first and second, walls join on a third wall 32d, 33d. This wall has a rectilinear section with a frustoconical portion shape.

On the counter mould 30 adjacent to the corner element, the central part 31 is connected to two surface portions, on both sides, 31d with a frustoconical shape, each respectively parallel to the surface portion 32d, 33d of the adjacent corner shaped counter mould element 32 or 33. Finally, the counter mould ends, on each side, with a central part 31 with the shape of a cylinder portion having the same axis as that of the support 20 and a radius equal to that of the flange to be achieved; the length thereof is also equal to the thickness of the flange to be achieved.

The various parts are arranged so that when the counter mould in a closing position of the mould, it provides, with the cylindrical part 21, a determined thickness of the radially measured preform. Being brought closer, the surfaces 31*d* come in abutment against the third walls of the corner shaped counter mould elements 32 and 33; then, when the shift of the counter mould proceeds, an abutment stress is applied by the surfaces 31*d* on the third walls 32*d* and 33*d*. Such a stress comprises a radial component and an axial component resulting in the corner shaped counter mould elements 32 and 33 moving and in the thickness of the preform becoming reduced in the contact areas of the corners with the preform. More specifically, the axial stress applied by the first wall 32*a* and 33*a* is oriented perpendicularly to the radial portion, 12 and 13 respectively, of the preform. In order to facilitate the shift of the corner elements at the surface of the cylindrical part of the preform and to avoid any possible tearing, thin metal sheets are arranged between the corner and the preform. Sliding thus occurs without damaging the latter. The metal sheet can be removed subsequently. In the closing position of the mould, the surfaces 31*d* of the counter mould are in contact with the surfaces 32*d*, respectively 33*d*, of the corner shaped counter mould elements 32 and 33 and the corner is spaced apart from the wall of the supporting part by the distance as determined by the axial length of the cylindrical wall portion 31*e* of the counter mould.

In summary, manufacturing a cylindrical part with a flange comprises the following steps. A preform formed with fibres is positioned on a cylindrical support 20, the profile of which is that of the interior of the part to be manufactured. The preform is not compressed, the fibrous structure is abundant. Such a support comprises supporting parts at the end for moulding flanges. A counter mould 30 is arranged having several circle arc elements, at least two half a circle elements, around the preform 10. Such a counter mould cooperates with corner shaped counter mould elements 32 and 33 on both sides of a central cylindrical part 31. The counter mould is brought closer to the support coming in abutment via slanted sides against the corners and drives them in a motion, both radially to the axis of the cylinder and axially in the direction to the supporting parts. When the counter mould is positioned, the thickness of the wall of the preform has been reduced without any unwanted bead or fold. The elements are bolted therebetween in order to prevent them from bursting upon the matrix being injected.

The polymer constituting the matrix is then injected, optionally using some vacuum. Once the polymerization is achieved, the part is released and the finishing operations are performed.

The invention claimed is:

1. A method for manufacturing an article made of composite material formed with a polymer matrix reinforced by a fibrous structure, comprising:

positioning the fibrous structure on a support forming a molding surface, the support including a cylindrical portion and a radially extending wall;

placing a first counter mold element on top of the fibrous structure, the first counter mold element having a first wall which is disposed opposite to the radially extending wall of the support, a second wall disposed opposite to the cylindrical portion of the support and adjacent to the radially extending wall of the support, and a third wall connecting the first and second walls of the first counter mold element;

covering the fibrous structure and the first counter mold element with a second counter mold element, the second counter mold element including a central part facing the cylindrical portion of the support and an angular surface;

compacting the fibrous structure through bringing the second counter mold element towards the support such that the angular surface of the second counter mold element abuts the third wall of the first counter mold element such that the first wall of the first counter mold element applies an axial stress to a portion of the fibrous structure abutting the radially extending wall of the support; and injecting the polymer matrix in the fibrous structure, the first and second counter mold elements move relative to each other during the compacting, the second counter mold element moving towards an axis of the cylindrical portion, and the angular surface of the second counter mold element being arranged with the third wall of the first counter mold element so that when the second counter mold element moves towards the axis of the cylindrical portion, the first counter mold element moves towards the radially extending wall of the support.

2. A method according to claim 1, wherein the first counter mold element includes a rounded section between the first and second walls.

3. A method according to claim 1, wherein the article is a turbo-machine casing.

4. A method according to claim 1, wherein the second wall of the first counter mold element is cylindrical and perpendicular to the first wall, and the third wall of the first counter mold element is frustoconical.

5. A method according to claim 1, wherein the central part of the second counter mold element presents a shape complementary to the cylindrical portion of the support, and the angular surface of the second counter mold element presents a shape complementary with the third wall of the first counter mold element.

* * * * *